United States Patent [19]

Neal

[11] Patent Number: 4,816,047
[45] Date of Patent: Mar. 28, 1989

[54] GAS DRYING APPARATUS

[75] Inventor: Brian P. Neal, Bristol, United Kingdom

[73] Assignee: Bendix Limited, Bristol, England

[21] Appl. No.: 143,907

[22] Filed: Jan. 13, 1988

[30] Foreign Application Priority Data

Jan. 15, 1987 [GB] United Kingdom ............... 8700803

[51] Int. Cl.$^4$ .............................................. B01D 53/04
[52] U.S. Cl. ...................................... 55/316; 55/387; 55/475
[58] Field of Search ................................ 55/161–163, 55/316, 350, 387, 389, 475, DIG. 11

[56] References Cited

U.S. PATENT DOCUMENTS

| | | | |
|---|---|---|---|
| 3,323,292 | 6/1967 | Brown | 55/162 |
| 3,464,186 | 9/1969 | Hankison et al. | 55/387 X |
| 3,472,000 | 10/1969 | Glass et al. | 55/387 X |
| 3,507,097 | 4/1970 | Crowley et al. | 55/163 X |
| 3,796,025 | 3/1974 | Kasten | 35/316 |
| 4,026,685 | 5/1977 | Grix | 55/316 X |
| 4,398,929 | 8/1983 | Seqersten | 55/163 |
| 4,544,385 | 10/1985 | Tanaka | 55/316 X |
| 4,572,725 | 2/1986 | Kojima | 55/316 X |
| 4,581,047 | 4/1986 | Larsson | 55/179 |
| 4,655,801 | 4/1987 | Kojima et al. | 55/387 X |

FOREIGN PATENT DOCUMENTS

| | | | |
|---|---|---|---|
| 3523406 | 1/1987 | Fed. Rep. of Germany | 55/387 |
| 3606817 | 9/1987 | Fed. Rep. of Germany | 55/387 |
| 22555 | 2/1985 | Japan | 55/161 |
| 2103954 | 3/1983 | United Kingdom | 55/179 |
| 2126124 | 3/1984 | United Kingdom | 55/387 |

Primary Examiner—Robert H. Spitzer
Attorney, Agent, or Firm—Ken C. Decker; William N. Antonis

[57] ABSTRACT

In an adaptation of an air dryer assembly for removing moisture from a stream of compressed air a container comprising a first part 15 and a second part 7 with a separable annular seal 17 and the adaptation including passageways for directing flow of compressed air from one part 2 of the main body via the inner container to another part 3 of the main body.

9 Claims, 5 Drawing Sheets

GAS DRYING APPARATUS

This invention relates to gas drying apparatus and relates especially to adaptation means for certain air dryers suitable for removing moisture from a stream of compressed air produced by a compressor for a compressed air vehicle braking system.

In compressed air vehicle braking systems it is desirable to remove as much aqueous moisture as possible from the stream of compressed air emanating from a compressor before the compressed air reaches storage reservoirs for subsequent use in the braking system. This is particularly important in cold weather conditions when freezing of condensed moisture can result in malfunction or even failure of critical valves or other components of the system.

An air dryer for a vehicle compressed air braking system usually comprises a housing containing a granular dessicant material through which compressed air is driven on its way to the storage reservoirs. Although means is provided for periodically purging the dessicant by dry air, in order to expel absorbed moisture, it is necessary to replenish the dessicant at regular intervals owing to the fact that it becomes progressively less effective in use and surface from contamination by carbon or oil contaminants and breaking down of the granules.

Various constructions have been proposed for such air dryers in the past but more recently in order to provide a compact assembly and afford a convenient way for vehicle operators to replace the dessicant and other expendible internal filter elements in the air dryer, it has been proposed to provide so-called "easy change" dessicant cartridges similar to now familiar cartridges available for oil filter replacements on automobile engines. Essentially, the air dryer is generally of a type the body of which is provided with an air egress passage through an externally screw-threaded spigot and disposed radially outward of the egress passage there are air input passages which communicate with threaded screw-on cartridge means retained by screwing same onto the spigot. A resilient rubber seal provides sealing of the whole cannister against the body of the air dryer unit. The construction of the cartridge normally involves a process whereby the gauge of the material of the cannister is limited by the ability to provide a joint by seaming at the open end. Such cartridges may, therefore, have a limited operating pressure when used with compressed air. Furthermore, it will be appreciated that with such an air dryer construction it is necessary for the vehicle operator to replace the complete cartridge at the end of each service interval.

According to the present invention there is provided adaptation means for gas drying apparatus which comprises a main body having a first passage for supplying compressed air to gas drying means attached thereto and a second passage for receiving compressed air from said gas drying means, one of said passages being located generally concentrically with an annular surface of the body for sealing between the body and a container for drying material, the adaptation means being characterized by a container having a first part and a second part with a separable annular seal between them and the second part being sealingly co-operable with said sealing surface, the first and second parts being separably retained together by means of an axial located screw-threaded retaining member which passes through a replaceable or rechargeable inner container for a drying material and means for directing flow of compressed gas between the first passage and the second passage via the drying material.

In order that the invention may be more clearly understood and readily carried into effect, the same will be further described by way of examples with reference to the accompanying drawings of which:

Figure 1:
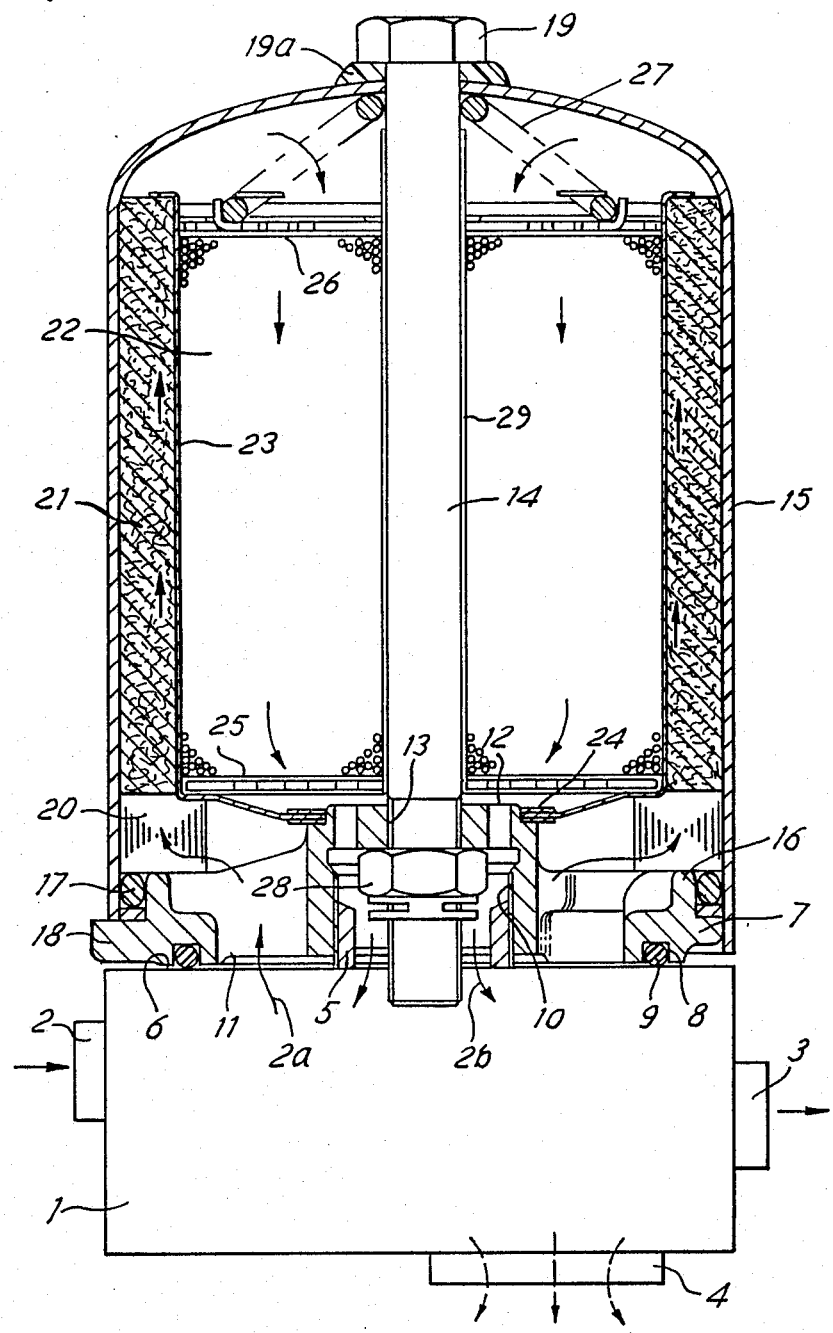
FIG. 1 illustrates an air dryer assembly incorporating an adaptor in accordance with the invention.

Referring to FIG. 1 the air dryer has a main body casting denoted by the block reference 1, having an input port 2 for connection to an air compressor, an output port 3 for connection to pipe leading via suitable protection valves to reservoirs of a vehicle braking system and a purge port 4 of the main body incorporating a suitable noise reducing device. The air dryer body 1 is provided with an externally threaded tubular spigot denoted by reference 5 which can receive a central internal thread of an air dryer cartridge of an "easy-change" type as referred to above.

By screwing such a suitable cartridge onto the spigot 5 an annular seal such as 9 between the cartridge and the main body 1 is drawn into sealing engagement with a flat annular sealing surface 6 of the air dryer main body. The seal thus effected encloses passages 2a and 2b in the air dryer body between the seal and an inlet port provided by the spigot 5 via which compressed air from the port 2 is fed into the carriage to return, after drying, via the central spigot 5 and the port 3.

An easy-change air dryer cartridge is normally required to be replaced in its entirety at service intervals. In accordance with the invention and as shown in FIG. 1, adaptation means comprising a generally annular member denoted by reference 7 is provided. This is typically an iron casting proceded with an annular groove 8 which receives annular seal 9 and a central internally threaded boss 10, the thread of which matches the external thread of existing spigot 5. The casting 7 is further provided radially inwardly of the seal 9 with a plurality of apertures such as 11 and a plurality of apertures such as 12, disposed around a central bore 13 to receive a retaining bolt 14 and recessed to accommodate a retaining nut 28.

The retaining bolt 14 serves to retain an outer generally cylindrical container 15 with its open end in sealing engagement with the periphery 16 of the casting 7 via an 'O' ring seal 17. The head 19 is welded to the closed upper end of the container and a projection 18 engages with a slot in the edge of the open end of the container 15 to prevent relative rotation between 15 and 7. Within the main container 15 there is provided in the path of incoming air via port 11, firstly an aluminium mesh filter 20, secondly, a generally cylindrical felt filter 21 and thirdly the main mass of dessicant granules 22 contained in a suitable inner container 23. The lower end of 23 has an aperture provided with a seal 24 which engages against the central boss 10 of the part 7 The inner container 23 has a central tube 29 to receive the retaining bolt 14 and the lower end of the container has a perforated fabric covered plate 25. The upper end of the container has a similar fabric covered retaining plate 26 which rests against the dessicant granules 22 and is acted upon by a compressed spring 27 bearing against the upper end of the outer container 15.

In operation of the air dryer, together with the adaptation and serviceable inner container the flow of compressed air is as indicated by the arrows shown in the drawing of FIG. 1. At service intervals it is possible after depressurising to remove the container 15 and member 7 from the body 1 by unscrewing from the spigot 5 using a socket spanner on the hand of the bolt 19. Thereafter, the container 15 can be removed from member 7 after detaching the nut 28 from retaining bolt 14 and any necessary service replacement of 20 and 21, desiccant 22 and plates 25, 26 can be readily effected before reassembly of the outer container 15 to the casting and replacing same on the body 1.

In an alternative embodiment, instead of providing a retaining nut such as 28, the casting 7 may itself be provided with a thread within its central bore 13 and the weld 19a may be replaced by sealing means permitting rotation of 18 relative to the housing 15. With such an embodiment the housing 15 may then be removed for servicing without removing the casting 7 from the body 1 of the air dryer.

Figure 2:
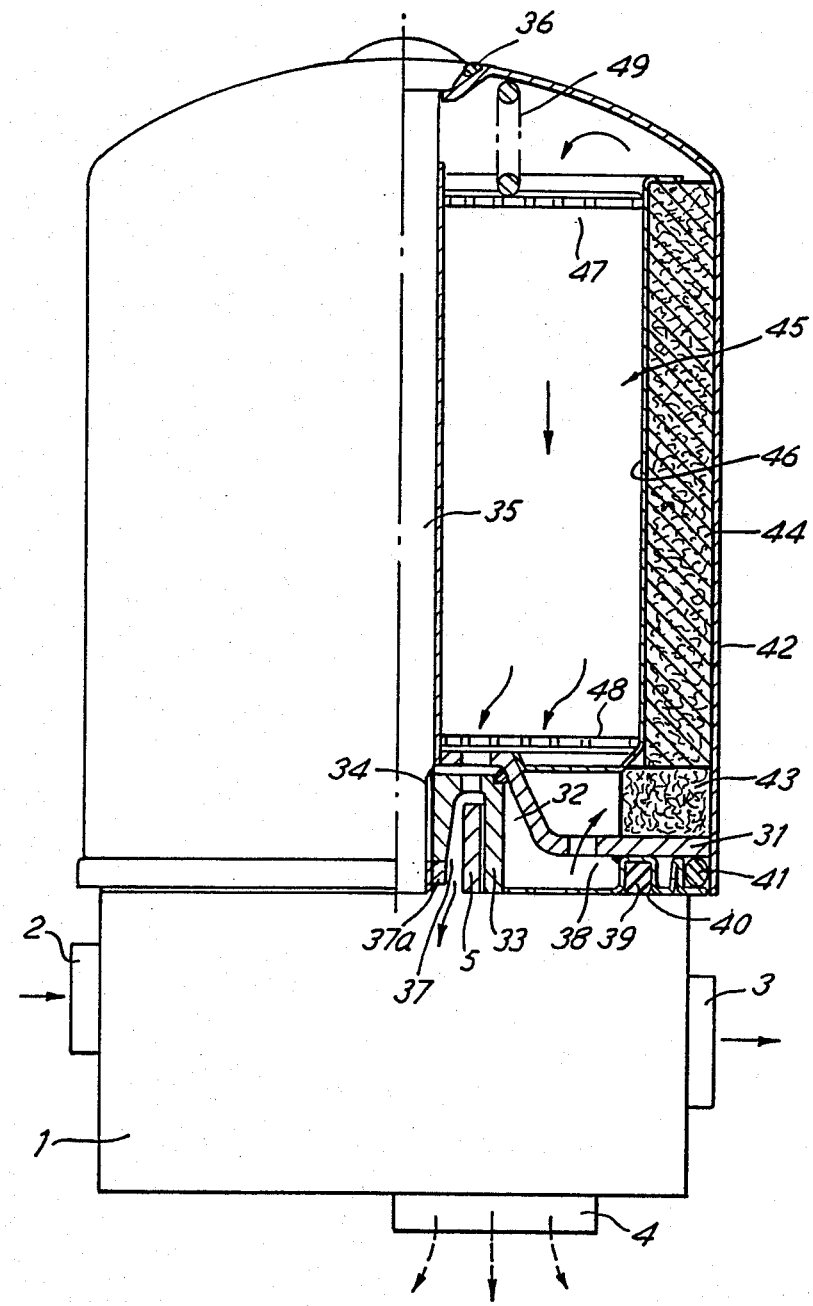
FIGS. 2, 3 and 4 illustrate alternative assemblies.

Referring now to FIG. 2 this shows an alternative embodiment of an air dryer wherein the adaptation includes a suitably corrosion-protected pressed steel member 31, and disposed centrally welded into a recess 32 there is a threaded nut member 33 for receiving the threaded end 34 of a bolt 35. The head of bolt 35 is welded at 36 into a depression in the upper end of the housing 42. The nut member 33 has an annular recess 37 for receiving the spigot 5 of the air dryer body 1 and a lock nut 37a, if fitted, will enable 33 to be unscrewed from 5 by rotation of 35. Welded to the lower surface 38 of the pressed steel member 31 there is a further pressed steel component 39 shaped to receive an annular seal 40 and an 'O' ring seal 41. The seal 40 provides sealing between the adaptor and the body 1 and the seal 41 provides sealing between the upper end of the housing 42 and the member 31.

The interior of the housing 42 is similar to that described above with reference to FIG. 1, in that it houses an aluminium mesh filter 43, a felt filter 44 and a mass of desiccant granules 45 contained in a cylindrical container 46 with retaining plates 47 and 48 maintained under compression by a spring 49.

In operation of the air dryer, incoming air follows the path of the arrows as before and passes through the mesh filter 43, the felt filter 44 and the desiccant 45, in that order, before being delivered via the interior of the central spigot 5 to the output port of the body 1. In order to service the air dryer, after depressurizing the housing and member 7 is removed by means of a suitable strap wrench whereby it is unscrewed from the spigot 5. Following this the lock nut (if fitted) 37a is removed followed by 33 thereby permitting the housing 42 to be dismantled from member 31 adaptor to provide access to the interior for replacement of the filters and desiccant before reassembly in the reverse order.

Figure 3:
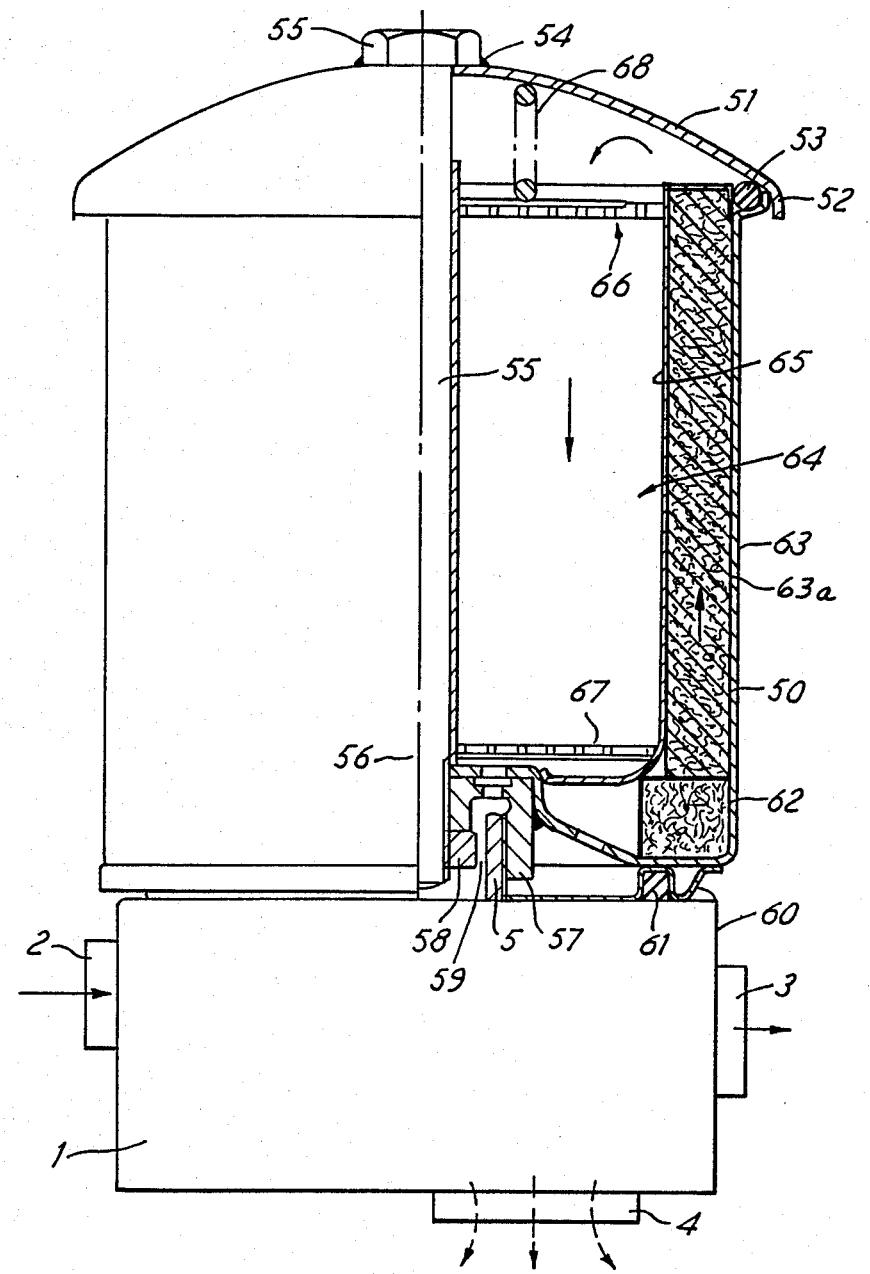

Referring now to FIG. 3, this shows an alternative embodiment of the invention wherein the adaptation comprises a container 63 formed largely of suitably corrosion protected pressed steel. An upwradly extending cylindrical wall 50 itself provides a cylindrical part of an outer container for the filters and desiccant. The upper end of the housing 50 is open and has a separate closure member 51 which sealingly engages with a lip 52 via the seal 53. The closure member has welded thereto, at 54, the head of a retaining bolt 55, the lower threaded end 56 of which is retained in a threaded nut member 57. A locking nut 58 is also provided optionally. As in the arrangement of FIG. 2, the member 57 has an annular recess 59 which is internally threaded to receive the spigot 5 of the air dryer. The underside of 63 the adaptor has welded thereto a pressed steel annular portion 60 shaped to receive a seal 61 for sealing against the upper face of the air dryer body 1.

The interior of the housing formed by the cylindrical wall 50 of the adaptor is provided with a crushed aluminium filter 62 & felt filter 63a lining the wall of 63. A central mass 64 of desiccant granules is contained again in a container 65 by fabric covered perforated end plates 66 and 67, under the influence of a compression spring 68 as before.

In operation of the embodiment shown in FIG. 3, the flow of air is indicated by arrows as before and for servicing purposes, the whole assembly of the housing 50, after depressurising, closure member 51 is removed by unscrewing from the spigot 5 by a suitable socket spanner on the hexagonal head of the bolt 55. Following this the closure member 51 is removed after detaching the locking nut 58 to provide access to the interior for replacement of the filters and desiccant and plates 66 and 67 before assembly in the reverse order.

Figure 4:
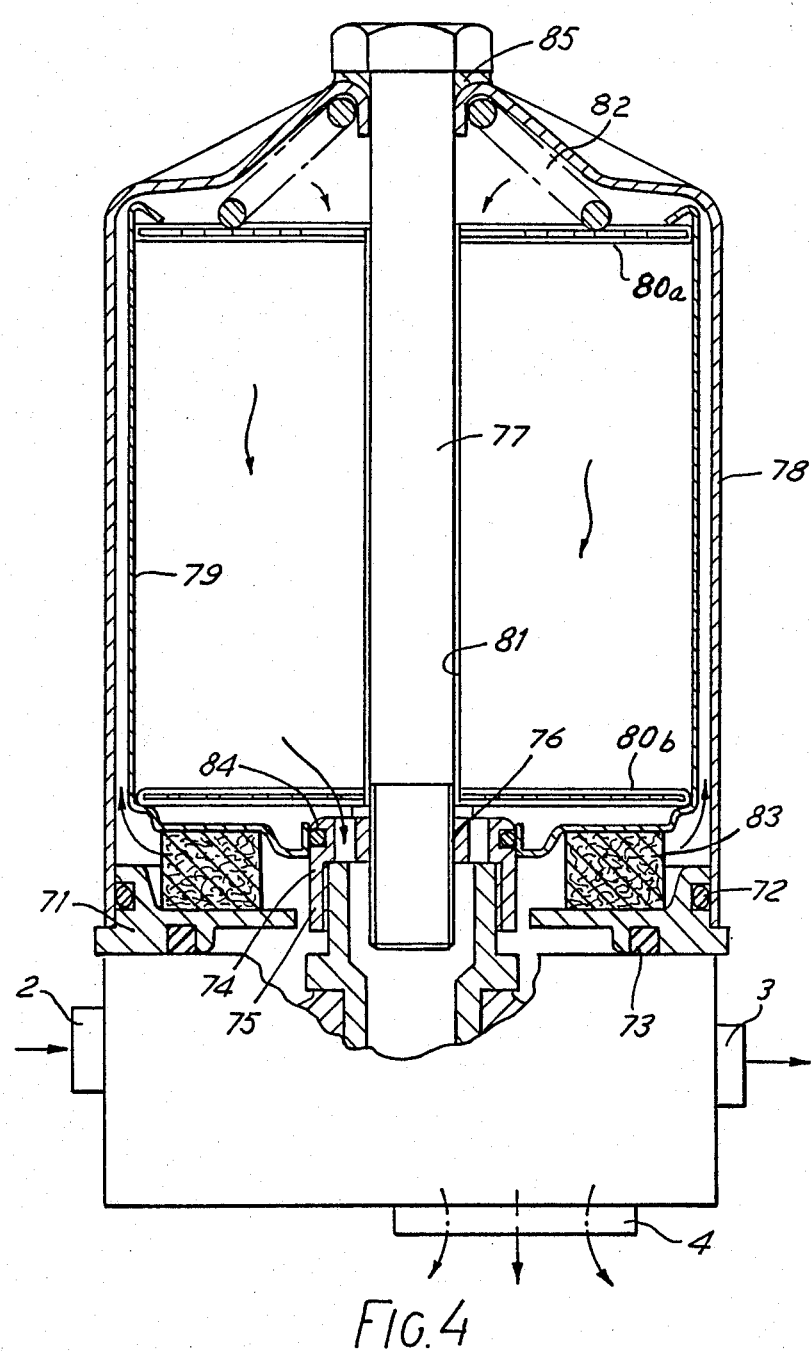

In yet another embodiment of the invention as shown in FIG. 4, the adaptation employs a cast annular member 71 arranged to accommodate annular seals 72 and 73 similar to those of FIG. 1, but the threaded spigot 5 of the air dryer main body is fitted with a separate inverted cup-shaped member 74 which is internally threaded at 75 and 76 to respectively receive the threads of the spigot 5 and the threaded axial bolt. When bolt 77 which has an upper 'O' ring 85 under its head, is screwed into position it traps the annular member 71 between the cylindrical container 78 and the main air dryer body. Captive within the container 78 there is a disposeable inner desiccant container 78 which is of light construction to include a cylindrical wall and fabric covered perforated end plates 80a and 80b slideable within 79 over a central tube 81. A captive spring 82 in the outer container bears against upper plate 80a to maintain the contained desiccant compacted in operation. The lower end of the inner container 79 is provided with an annular lower end shaped to rest against an annular crushed aluminium felt filter element 83 and to sealingly engage an 'O' ring seal 84 carried by member 74.

In operation, air flow is again as indicated by the arrows and for servicing the assembly is readily dismantled by removing the axial bolt 77 to give access to the container element 79 which can be discarded and replaced with a new one.

In each of the embodiments of FIGS. 1, 2, 3 and 4 the generally annular part such as 7 of FIG. 1, say, is provided with or accompanied by an internally threaded boss which threadedly engages an externally threaded spigot which defines a central air outflow passage. In an alternative case, such a spigot may not be provided or may simply be detachable from the main body casting of the air dryer. The externally threaded spigot may then be substituted by a single member as shown at 86 in the fragmental view of FIG. 5 which takes the place of the two members 74 and 75 of FIG. 4.

Figure 5:
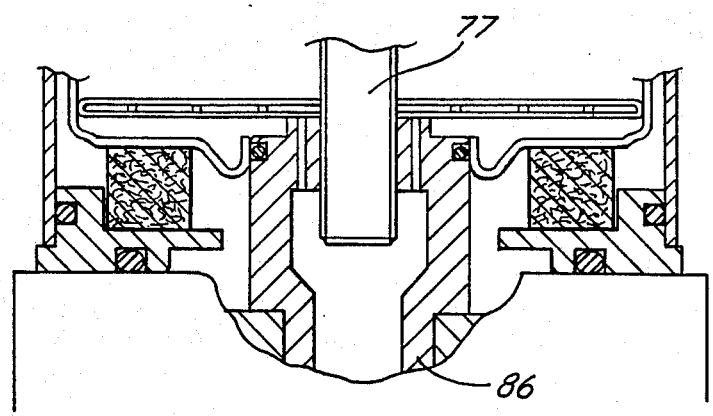
FIGS. 5 and 6 illustrate fragmental views of further alternatives.
Figure 6:
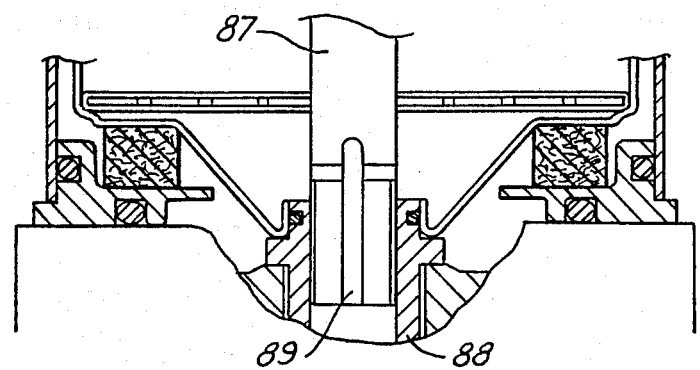

Lastly, the fragmental view of FIG. 6 shows yet another alternative wherein the rather bulky member 86 of Fig. 5 is replaced by a simpler internally and externally threaded member 88 and the flow path between the second passage of the main body and the inerior of the container is provided via an axial drilling 89 in a lower end portion of the axial screw threaded hold 87.

Although in FIGS. 1 to 3 the internal desiccant containers are rechargeable whereas the internal containers in FIGS. 4, 5 and 6 are disposable either is merely a matter of practical choice in each case.

By virtue of the foregoing described embodiments, it will be observed that the outer container of the adaptation may be constructed of relatively heavy gauge material such as mild steel and the thickness is not limited by a need to effect a seaming closure as is the case with a cartridge of the "easy-change" type. On the other hand, the adaptation is readily incorporated to an air dryer designed to initially receive cartridge of the "easy-change" type.

Whilst several embodiments of adaptations have been described herein, it will be appreciated that other variations on these may be made within the concept of the invention.

I claim:

1. Adaptation means for gas drying apparatus which comprises a main body having a first passage for supplying compressed air to gas drying means attached thereto and a second passage for receiving compressed air from said gas drying means, one of said passages being located generally concentricly with an annular surface of the body for sealing between the body and a container for drying material, the adaptation means being characterised by a container having a first part and a second part with a separable annular seal between them and the second part being sealingly co-operable with said sealing surface, the first and second parts being separably retained together by means of an axial located screw-threaded retaining member which passes through a replaceable or rechargeable inner container for a drying material and means for directing flow of compressed gas between the first passage and the second passage via the drying material.

2. Adaptation means as claimed in claim 1 characterised by said second part having a generally axial recess threadedly co-operable with a threaded tubular spigot defining the second said passage and said recess accomodating a nut on the axially located screw threaded member.

3. Adaptation means as claimed in claim 1 characterised by said second part having a generally axial recess threadedly co-operable with a threaded tubular spigot defining the second said passage and said recess having a threaded axial portion co-operable with a threaded end of the axially located screw threaded member.

4. Adaptation means as claimed in claim 1 characterised by an end portion of said axially located screw threaded member being co-operable with an internal screw thread insert provided in said main body with a recess defining said second passage.

5. Adaptation means as claimed in claim 4, said end portion of the axially lcoated screw threaded member having a bore providing connection between said second passage and the interior of said container.

6. Adaptation means as claimed in claim 1 characterised by an internally threaded adaptor boss co-operable with a central threaded spigot carried by the main body said adaptor boss having an internal screw thread to receive said axial retaining member.

7. Adaptation means as claimed in claim 6 characterised by said generally axial recess or said adaptor boss being provided with a passage located radially outward of the screw threaded member and providing connection between said second passage and the inerior of the container.

8. Adaptation means as claimed in claim 6 characterised by the inner container being sealingly engageble with the second part or adaptor boss whereby gas flow is constrained to pass between the first and second passages via the outside of the inner container and through the contained drying material.

9. Adaptation means as claimed in claim 8 characterised by an annular filter element being clamped between the inner container and the second part so that the gas flow to the outside of the inner container is via the annular filter element.

* * * * *